(12) United States Patent
Shirakawa et al.

(10) Patent No.: US 7,372,877 B2
(45) Date of Patent: May 13, 2008

(54) FIBER LASER UNIT

(75) Inventors: Akira Shirakawa, RC207, 1-1-1, Kojima-cho, Choufu-shi, Tokyo 182-0026 (JP); Kenichi Ueda, RA310, 1-1-1, Kojima-cho, Choufu-shi, Tokyo 182-0026 (JP); Hirofumi Kan, Hamamatsu (JP); Hirofumi Miyajima, Hamamatsu (JP)

(73) Assignees: Hamamatsu Photonic K.K., Shizuoka (JP); Kenichi Ueda, Tokyo (JP); Akira Shirakawa, Tokyo (JP)

( * ) Notice: Subject to any disclaimer, the term of this patent is extended or adjusted under 35 U.S.C. 154(b) by 62 days.

(21) Appl. No.: 10/518,234

(22) PCT Filed: Jun. 20, 2003

(86) PCT No.: PCT/JP03/07886

§ 371 (c)(1),
(2), (4) Date: Dec. 16, 2004

(87) PCT Pub. No.: WO04/001919

PCT Pub. Date: Dec. 31, 2003

(65) Prior Publication Data

US 2005/0238065 A1  Oct. 27, 2005

(30) Foreign Application Priority Data

Jun. 21, 2002 (JP) .............................. 2002-181821

(51) Int. Cl.
*H01S 3/30* (2006.01)
(52) U.S. Cl. ............................................ 372/6; 372/70
(58) Field of Classification Search ................... 372/6, 372/70

See application file for complete search history.

(56) References Cited

U.S. PATENT DOCUMENTS 6,298,187 B1 * 10/2001 Waarts et al. ................. 385/37

OTHER PUBLICATIONS

Lyndin et al., "Coherent coupling of two $Nd^{3+}$-doped single-mode waveguide lasers using Y-junction," Proceedings of the SPIE, vol. 2212, Apr. 1994, pp. 564-570.
Lyndin et al., "Laser System Composed of Several active elements connected by single-mode couplers," American Institute of Physics, vol. 24, No. 12, Dec. 1994, pp. 1058-1061.
Kozlov et al., "All-fiber coherent beam combining of fiber lasers," Optics Letters, Optical Society of America, vol. 24, Dec. 1999, pp. 1814-1816.

(Continued)

*Primary Examiner*—Dung Michael T. Nguyen
(74) *Attorney, Agent, or Firm*—Drinker Biddle & Reath LLP

(57) ABSTRACT

Fiber laser unit 1 comprises a plurality of fiber lasers 2 and 3 that generate laser beams by exciting a laser active substance inside cores 2a and 3a by exciting light, propagate the laser beams inside the cores 2a and 3a, and output the laser beams from the end portions 2c and 3c, wherein the respective fiber lasers 2 and 3 have resonators 4 and 5 that reflect the laser beams on both ends 2b, 2c, 3b, and 3c thereof and have a structure in which a part of the cores 2a and 3a is reduced in diameter, the diameter reduced portions of the cores 2a and 3a are made proximal to each other, injection synchronization is carried out inside the resonators 4 and 5 by laser beams leaked from the cores 2a and 3a, and a loss is applied to the port of either one of the fiber lasers 2 and 3. According to this fiber laser unit 1, by a simple structure in which the cores 2a and 3a are made proximal to each other and injection synchronization is carried out by using laser beams leaked from the cores 2a and 3a, coherent addition of lasers with extremely high addition efficiency is realized.

3 Claims, 8 Drawing Sheets

OTHER PUBLICATIONS

Kibler et al., "Optical Data Links for Automotive Applications," 2004 Electronic Components and Technology Conference, Jun. 1-4, 2004, vol. 2, pp. 1360-1370.

Shirakawa et al., "Coherent addition of Fiber lasers by use of a fiber coupler," Optics Express, Optical Society of America, vol. 10, No. 21, Oct. 21, 2002, pp. 1167-1172.

Sabourdy et al., "Power scaling of fibre lasers with all-fibre inteferometric cavity." Electronics Letters, vol. 38, No. 14, Jul. 4, 2002, pp. 692-693.

T. Saitou et al., *Characteristics of a Fiber Arrayed Laser By Using a Directional Fiber Coupler*, CRL International Symposium on Propagation and Sensing Technologies for Future Applications, Technical Digest, Mar. 13-14, 2002, Tokyo, Japan.

Simpson, T.B. et al., Extraction characterisitics of a dual fiber compound cavity, Optics Express, Oct. 7, 2002, vol. 10, No. 20, pp. 1060 to 1073.

Simpson, T.B. et al., Coherent Intracavity Coupling of Fiber Lasers, 2001 IEEE/LEOS Annual Meeting Conference Proceedings (LEOS 2001), Nov. 14, 2001, vol. 1, pp. 62 to 63, ISSN:1092-8081.

Kozlov, V.A. et al., All-fiber coherent beam combining of fiber lasers, Optics Letters, Dec. 15, 1999, vol. 24, No. 24, pp. 1814 to 1816.

Shirakawa, A. et al., Coherent addition of fiber lasers by use of a fiber coupler, Optics Express, Oct. 21, 2002, vol. 10, No. 21, pp. 1167 to 1172.

Tomoki Sekiguchi et al., "Hikari Fiber Coupler o mochiita Laser diode no Coherent Kasan", 2002 nen, Shuki Dai 63 kai Extended abstracts; The Japan Society of Applied Physics, Sep. 24, 2002, No. 3, p. 933, (lecture No. 25p-YC-1).

Akira Shirakawa et al. "Hokosei Ketsugoki o Mochiita Coherent Fiber Array Laser", 2002 nen (Heisei 14 nen), Shunki Dai 49 kai Oyo Butsurigaku Kankei Rengo Koenkai Koen Yokoshu, Mar. 27, 2002, No. 3, p. 1055, (lecture No. 30a-ZG-9).

Lyndin, N.M. et al., Laser system composed of several active elements connected by single-mode couplers, Quantum Electronics, Dec. 1994, vol. 24, No. 12, pp. 1058 to 1061.

Lyndin, N.M. et al., Coherent coupling of two $Nd^{3+}$-doped single-mode waveguide lasers using Y-junction, Proceedings of the SPIE-The International Society for Optical Engineering, Apr. 1994, vol. #2212, pp. 564 to 570.

Sabourdy, D. et al., Power scaling of fiber lasers with all-fiber interferometric cavity, Electronics Letters, Jul. 4, 2002, vol. 38, No. 14, pp. 692 to 693.

Morel, J. et al., Coherent coupling of an array of $Nd^{3+}$-doped single-mode fiber lasers by use of an intracavity phase grating., Optics Letters, Sep. 15, 1993, vol. 18, No. 18, pp. 1520 to 1522.

Diode Laser Arrays, D. Botez and D.R. Scifres, Cambridge Studies in Modern Optics, 1994, p. 1.

A Coherent All-Solid-State Laser Array Using the Talbot Effect in a Three-Mirror Cavity. Y. Kono, M. Takeoka, K. Uto, A. Uchida, and F. Kannari, IEEE Journal of Quantum Electronics, vol. 36, 2000, pp. 1-8.

Phase-locking of the 2D structures, V.V. Apollonov, S.I. Derzhavin, V.I. Kislov, V.V. Kuzminov, D.A. Mashkovsky, and A.M. Prokhorov, Opt. Express 4, 1999, pp. 19-26.

\* cited by examiner

FIBER LASER UNIT

TECHNICAL FIELD

The present invention relates to a fiber laser unit having a plurality of fiber lasers.

BACKGROUND ART

Various lasers have been actively developed, and in particular, among the lasers, a laser with high output and high spatial coherence has been demanded. As a method for realizing this, there is known a method which realizes high output by coherent addition (coupling) of outputs of a plurality of lasers. As an example, coherent addition (coupling) of lasers by means of evanescent coupling of laser arrays or diffraction coupling by using a Talbot mirror have been studied. An example of the evanescent coupling is disclosed in "*Diode Laser Arrays*," D. Botez and D. R. Scifres, *Cambridge Studies in Modern Optics,* 1994, p. 1, and an example of the Talbot resonator relating to solid-state lasers is disclosed in "*A Coherent All-Solid-State Laser Array Using the Talbot Effect in a Three-Mirror Cavity,*" Y. Kono, M. Takeoka, K. Uto, A. Uchida, and F. Kannari, *IEEE Journal of Quantum Electronics, Vol.* 36, 2000, pp. 1-8, and an example of the Talbot resonator relating to laser diode arrays is disclosed in "*Phase-locking of the 2D structures,*" V. V. Apollonov, S. I. Derzhavin, V. I. Kislov, V. V. Kuzminov, D. A. Mashkovsky, and A. M. Prokhorov, *Opt. Express* 4, 1999, pp. 19-26.

DISCLOSURE OF THE INVENTION

However, as described above, in the coherent addition of the conventional method, various super modes are easily excited as well as a super mode to be coherently added. Furthermore, a distant field image coherently added also has fringe corresponding to the spatial frequencies of the laser arrays and its beam pattern is inferior. Therefore, in the conventional method, an increase in loss caused by these poses various problems such that high addition efficiency cannot be obtained, and practical use thereof has not been realized. Particularly, in the case of a Talbot resonator, very accurate adjustment is required so as to obtain phase coupling, so that it is not suitable for industrial use.

Therefore, an object of the present invention is to provide a fiber laser unit excellent in addition efficiency of coherent addition.

A fiber laser unit relating to the present invention has a plurality of fiber lasers that generate laser beams by exciting a laser active substance inside cores by exciting light and propagate the laser beams in the cores and output them from the end portions, wherein each fiber laser has a resonator structure that reflects a laser beam on both ends, the cores of the fiber lasers are made proximal to each other at a part, and by a laser beam that has excited from the inside of the core of an arbitrary fiber laser, injection synchronization is carried out inside the resonators of other fiber lasers.

According to this fiber laser unit, laser beams leak from the cores of the respective fiber lasers, and the leaked laser beams enter the cores of other fiber lasers disposed in proximity and are coupled with the laser beams propagating inside the cores of the other fiber lasers, and injection synchronization is carried out inside the resonators. At this point, when the fiber lasers are structured so that a laser beam is outputted from one fiber laser among the plurality of fiber lasers, laser beams are coherently added with high addition efficiency inside the resonator of the one fiber laser, and from the end portion thereof, a coherently added laser beam is outputted.

In the above-described fiber laser unit of the present invention, it is also possible that the cores of the fiber lasers are reduced in diameter at a part and the diameter reduced portions of the cores are made proximal to each other.

According to this fiber laser unit, a large amount of laser beams leak due to reduction in diameter of the cores and promotes injection synchronization.

In the fiber laser unit of the present invention, it is possible that the diameter reduced portion and the proximity portion are formed by an optical fiber coupler.

According to this fiber laser unit, the section where the cores are reduced in diameter and made proximal to each other is formed by an optical fiber coupler, whereby the entire unit can be easily constructed.

In the fiber laser unit of the present invention, it is possible that, among the plurality of fiber lasers, except for one fiber laser, a loss is applied to ports of other fiber lasers.

According to this fiber laser unit, by applying a loss such as a bend loss to the ports of fiber lasers except for one fiber laser, a fiber laser to output a coherently added laser beam can be specified. Thereby, the output port can be switched in the fiber laser unit.

BEST MODES FOR CARRYING OUT THE INVENTION

Hereinafter, an embodiment of a fiber laser unit of the present invention is described with reference to the drawings.

In the invention, for realizing coherent addition with high addition efficiency, a fiber laser unit is constructed in which a part of the cores of a plurality of fiber lasers is reduced in diameter to leak laser beams from cores, the leaked laser beams are made to enter the insides of the cores of other fiber lasers disposed in proximity to carry out injection synchronization. When this fiber laser unit is formed so that a laser beam is outputted from one fiber laser by means of application of a bend loss, etc., to ports, from the one fiber laser, an output coherently added with laser beams of other fiber lasers is obtained.

In this embodiment, the concept of the invention is described and then a fiber laser unit having two fiber lasers applied with the invention is described in detail. In this embodiment, the structure of the portion where the cores are made proximal to each other and reduced in diameter is also described with two patterns.

Figure 1:
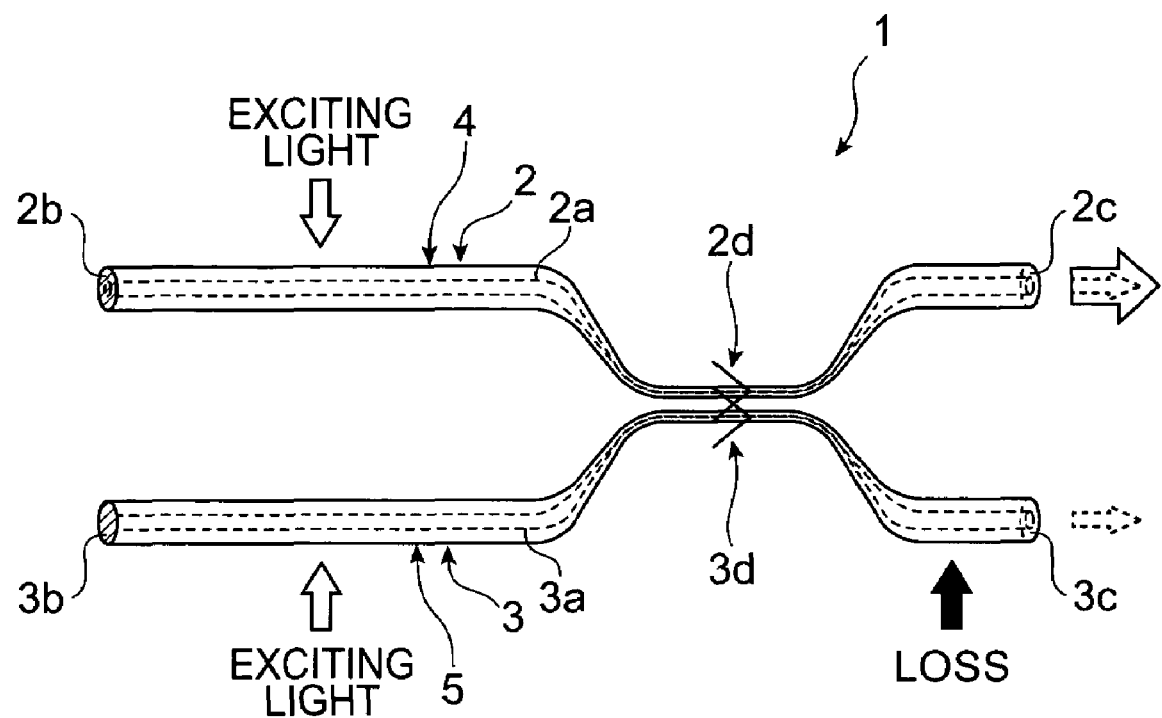
FIG. 1 is a conceptional view of a fiber laser unit relating to the present invention.
Figure 2:
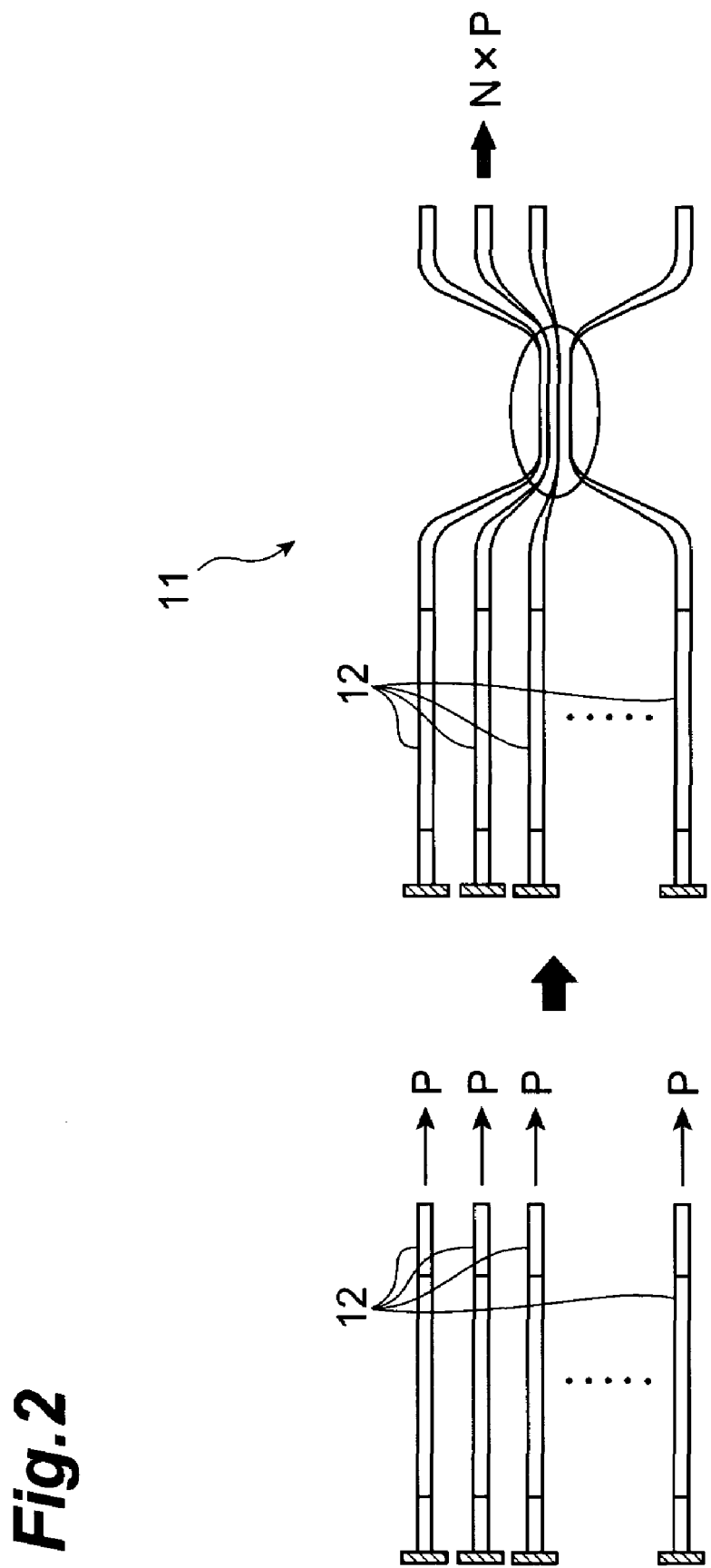
FIG. 2 is a schematic view of coherent addition in fiber laser unit having N fiber lasers relating to the present invention.

The concept of the fiber laser unit relating to the invention is described with reference to FIG. 1 and FIG. 2. FIG. 1 is a conceptional view of the fiber laser unit relating to the invention. FIG. 2 is a schematic view of coherent addition in a fiber laser unit having N fiber lasers relating to the invention.

The fiber laser unit 1 has two fiber lasers 2 and 3. The fiber lasers 2 and 3 are single mode fiber lasers with cores 2a and 3a doped with a laser active substance such as erbium (Er), etc., which form resonators 4 and 5 having one end portions 2b and 3b that fully reflect laser beams and the other end portions 2c and 3c that partially reflect laser beams. The fiber lasers 2 and 3 are formed so that the cores 2a and 3a are thin at the middle portions 2d and 3d thereof. In the fiber laser unit 1, the middle portions 2d and 3d where the cores 2a and 3a are reduced in diameter are disposed in proximity to each other. The level of this proximity corresponds to oscillation wavelengths of laser beams (several micrometers). In the fiber laser unit 1, the output sides from the middle portions 2d and 3d (when they are formed by an optical fiber coupler, the output side from the optical fiber coupler) serve as ports of fiber lasers 2 and 3.

In the fiber laser unit 1, when the cores 2a and 3a of the fiber lasers 2 and 3 are irradiated with exciting light, the laser active substance is excited to cause laser oscillation, and laser beams with oscillation wavelengths different from each other are generated. At this point, in this fiber laser unit 1, the cores 2a and 3a are reduced in diameter at the middle portions 2d and 3d of the fiber lasers 2 and 3, a large amount of laser beams leak from there. Then, a part of the leaked laser beams enters the cores 2a and 3a of the other fiber lasers 2 and 3 and are coupled with laser beams generated in the cores 2a and 3a that the leaked laser beams have entered to carry out injection synchronization inside the resonators 4 and 5. At this point, when a loss is applied to the port of either one of the fiber lasers 2 and 3, a coherently added laser beam is outputted from the other ends 2c or 3c of the other fiber laser 2 or 3 that has not been applied with the loss. This coherently added output becomes almost equal to a sum of output values of the laser beams when the fiber lasers 2 and 3 output the laser beams independently.

Furthermore, leak of laser beams is promoted by reducing the diameters of the cores 2a and 3a, and even when the cores 2a and 3a are not reduced in diameter, laser beams leak from the cores 2a and 3a, so that the cores 2a and 3a are not necessarily reduced in diameter. The most important point is that the cores 2a and 3a are disposed in proximity to each other. As the distance between the cores 2a and 3a becomes shorter, the near-field interaction becomes greater and the section of proximity of the cores 2a and 3a can be shortened (when this section is formed by an optical fiber coupler, the length of the optical fiber coupler can be shortened). On the other hand, even when the distance between the cores 2a and 3a is long, the same effect can be obtained by lengthening the section of proximity of the cores 2a and 3a.

Coherent addition based on the principle described above can be realized regardless of the number of fiber lasers. As shown in FIG. 2, in a fiber laser unit 11 having N fiber lasers 12 . . . , the fiber lasers 12 . . . have the same structure as that of the fiber lasers 2 and 3 described above, and an output value when the fiber lasers 12 . . . output laser beams independently is defined as P. In this fiber laser unit 11, when a loss is applied to the ports of the fiber lasers 12 . . . except for one fiber laser, an output of N×P can be obtained from the one fiber laser 12 that has not been applied with the loss (however, in actuality, the output lowers by several percent due to the loss).

Figure 3:
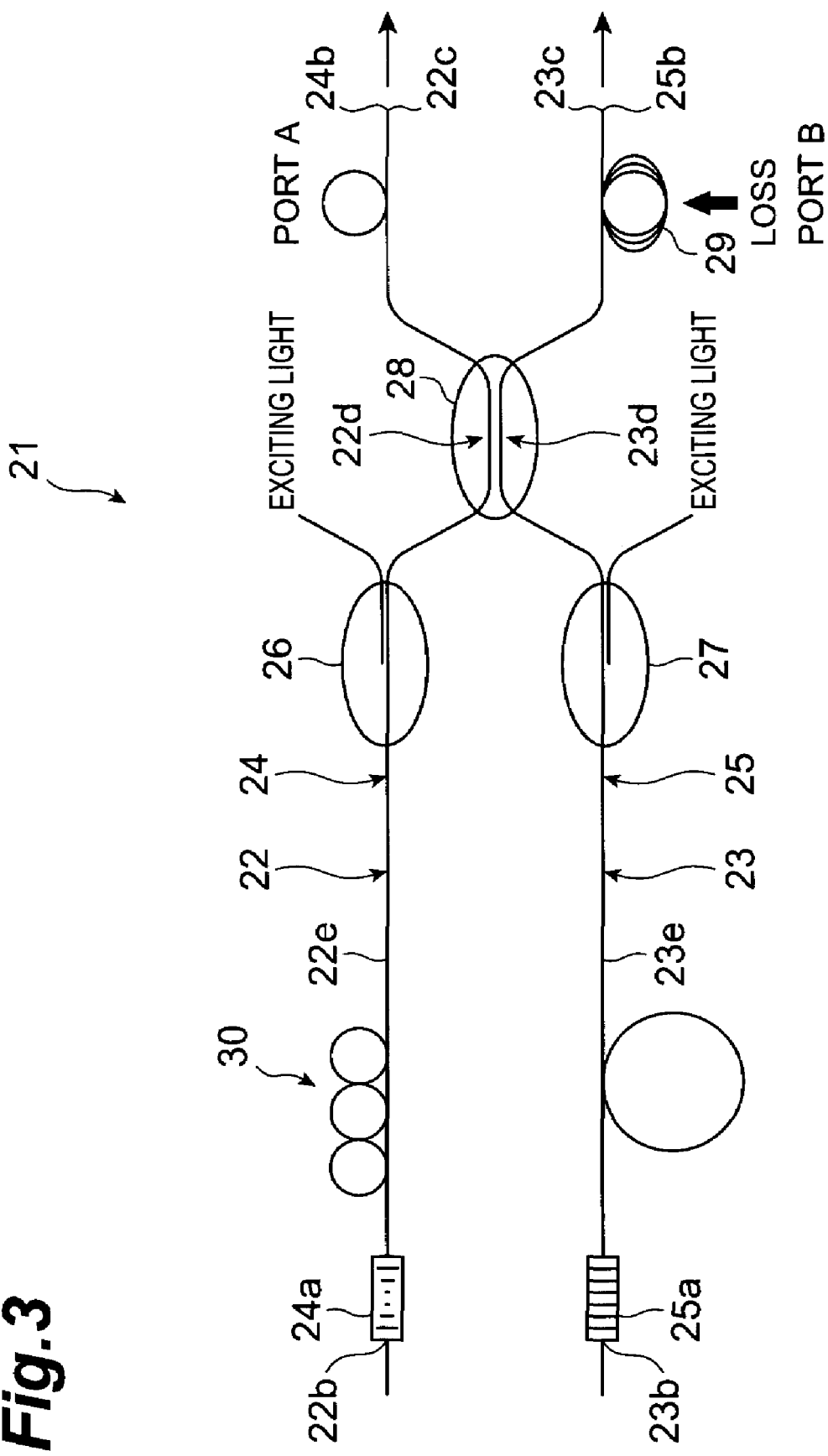
FIG. 3 is a structural view of a fiber laser unit relating to an embodiment of the present invention.

The structure of a fiber laser unit 21 relating to this embodiment is described with reference to FIG. 3. FIG. 3 is a structural view of the fiber laser unit relating to this embodiment.

The fiber laser unit 21 has two fiber lasers 22 and 23, and an output obtained by coherent addition of laser beams of the two fiber lasers 22 and 23 can be outputted from one of the fiber lasers. In the fiber laser unit 21, in order to couple the two fiber lasers 22 and 23, an optical fiber coupler 28 is provided on the middle portions 22d and 23d thereof, and coherent coupling of the laser beams between the two fiber lasers 22 and 23 is realized by this optical fiber coupler 28.

The fiber laser 22 is a single mode fiber laser formed by doping erbium into the core of a silica-based single mode optical fiber 22e, and the entire optical fiber 22e forms a resonator 24 and introduces exciting light by a WDM (Wavelength Division Multiplexing) coupler 26. The fiber laser 22 outputs a laser beam with an oscillation wavelength of 1556.9 nm from the port A of the other end portion 22c, and when it outputs independently in a non-coupled state, the output value becomes 1.36 W. Furthermore, the fiber laser 22 has a polarization controller 30 on one end portion 22b side to obtain high addition efficiency by equalizing polarization between the lasers. Furthermore, in coherent addition, high addition efficiency cannot be obtained due to interference of a plurality of electric fields unless polarization is equal between lasers, so that a polarization controller 30 is used in the fiber laser unit 21, and the polarization controller can be provided in the fiber laser 23 in place of the fiber laser 22. Furthermore, when a fiber that stores polarization is used, the polarization controller 30 becomes unnecessary.

The resonator 24 is formed by a fiber diffraction grating (FBG: Fiber Bragg Grating) 24a provided on one end portion 22b of the fiber laser 22 and a reflecting end face 24b provided on the other end portion 22c. The fiber diffraction grating 24a has characteristics to reflect light with a wavelength of 1556.9 nm at a reflectance higher than 99% (almost 100% reflectance), and transmits light with other wavelengths. The reflecting end face 24b has characteristics to reflect light with a wavelength of 1556.9 nm at a reflectance of 3.4% and transmits the remaining light.

The WDM coupler 26 couples exciting light with 1484 nm and 2.05 W with the core inside the resonator 24.

The fiber laser 23 is a single mode fiber laser formed by doping erbium into the core of a silica-based single mode optical fiber 23e, and the entire optical fiber 23e forms a resonator 25 and introduces exciting light by a WDM coupler 27. The fiber laser 23 outputs a laser beam with an oscillation wavelength of 1557.1 nm from the port B on the other end 23c, and when it outputs independently in a non-coupled state, the output value becomes 1.47 W.

The resonator 25 is formed by a fiber diffraction grating (FBG) 25a provided on one end 23b of the fiber laser 23 and a reflecting end face 25b provided on the other end 23c. The fiber diffraction grating 25a has characteristics to reflect light with a wavelength of 1557.1 nm at a reflectance higher than 99% (almost 100% reflectance), and transmits light with other wavelengths. The reflecting end face 25b has characteristics to reflect light with a wavelength of 1557.1 nm at a reflectance of 3.4% and transmits the remaining light.

The WDM coupler 27 couples exciting light with 1484 nm and 2.05 W with the core inside the resonator 25.

Figure 4A:
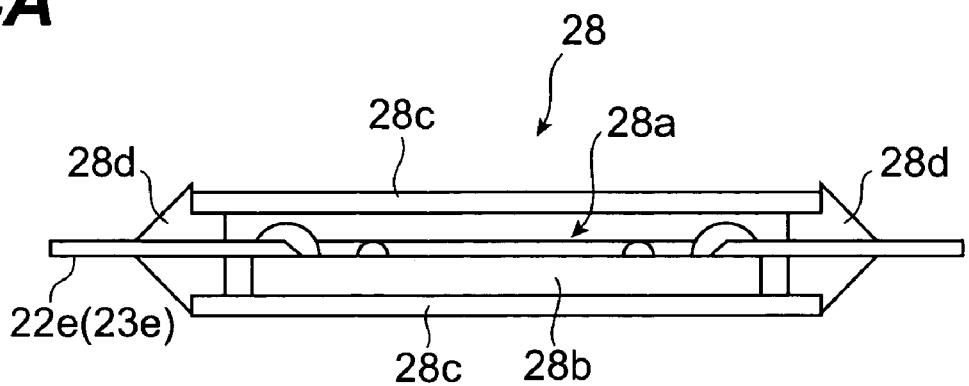
FIG. 4A is a side view of an optical fiber coupler of FIG. 3.
Figure 4B:
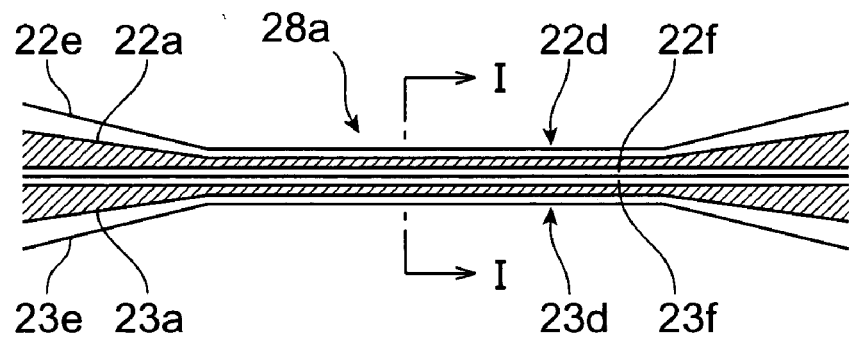
FIG. 4B is a plan view of a melt-drawn portion of the optical fiber coupler of FIG. 3.
Figure 4C:
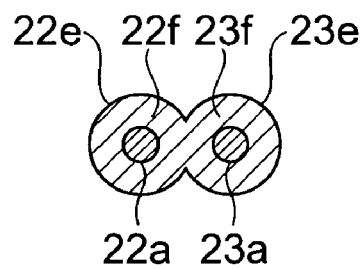
FIG. 4C is a sectional view along the I-I line of FIG. 4B.

The optical fiber coupler 23 is described with reference to FIG. 4A, FIG. 4B, and FIG. 4C also. FIG. 4A is a side view of the optical fiber coupler of FIG. 3. FIG. 4B is a plan view of the melt-drawn portion of the optical fiber coupler of FIG. 3. FIG. 4C is a sectional view along the I-I line of FIG. 4B.

The optical fiber coupler 28 is of 2×2 and has a branching ratio of 50:50, wherein laser beams are leaked from cores 22a and 23a of two optical fibers 22e and 23e, and the leaked laser beams are coupled inside the other side cores 22a and 23a. Therefore, the optical fiber coupler 28 has a melt-drawn portion 28a that is formed by melting and drawing the middle portions 22d and 23d of two optical fibers 22e and 23e and joining clads 22f and 23f of the two optical fibers 22e and 23e. At the melt-drawn portion 28a, the optical fibers 22e and 23e (cores 22a and 23a) are reduced in diameter and the cores 22a and 23a are disposed in extremely close proximity to each other.

In the optical fiber coupler 28, the melt-drawn portion 28a is fixed onto a silica-based substrate 28b and sealed within a space with a small thermal expansion coefficient formed by invar 28c and 28c and sealing materials 28d and 28d.

Furthermore, in the fiber laser unit 21, in order to output a coherently added laser beam from one of the fiber lasers 22 and 23, a loss is applied to the port of the other one of the optical fibers 22e and 23e. Therefore, in the fiber laser unit 21, in order to positively increase the bend loss on the port of one of the optical fibers 22e and 23e, the port of one of the optical fibers 22e and 23e is provided with a bend loss portion 29 and the number of times of bending on the port of one of the optical fibers 22e and 23e is increased to forcibly increase the bend loss. In FIG. 3, the bend loss of the port of the optical fiber 23e is increased, so that a coherently added laser beam is outputted from port A of the fiber laser 22.

Figure 5:
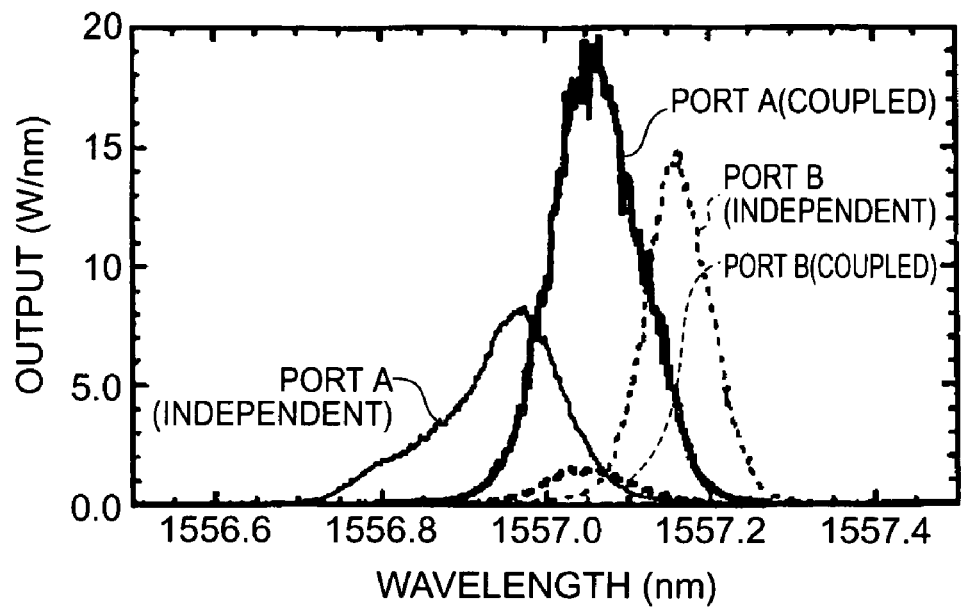
FIG. 5 is a diagram showing output spectra of the fiber laser unit of FIG. 3.

Action of the fiber laser unit 21 is described with reference to FIG. 5 also. FIG. 5 is a diagram showing output spectra of the fiber laser unit.

In the fiber laser unit 21, when exciting light beams are coupled to the cores 22a and 23a of the optical fibers 22e and 23e from the WDM couplers 26 and 27, erbium ions inside the core 22a and 23a are excited and the emitted fluorescence propagates back and forth within the resonators 24 and 25. Then, they are subjected to laser amplification inside the resonators 24 and 25 to generate laser beams with oscillation wavelengths different from each other (1556.9 nm and 1557.1 nm) inside the resonators 24 and 25, respectively, and the laser beams propagate inside the cores 22a and 23a.

At this point, since the cores 22a and 23a are reduced in diameter at the melt-drawn portion 28a of the optical fiber coupler 28, laser beams leak from the cores 22a and 23a. Furthermore, since one optical fiber 23e is applied with a loss by means of bending at the bend loss portion 29, at the melt-drawn portion 28a of the optical fiber coupler 28, the laser beam that has leaked from the core 23a is drawn into the core 22a disposed in proximity, and the drawn-in laser beam propagates in the core 22a. Then, while the drawn-in laser beam propagates back and forth inside the resonator 24, it is coherently coupled with the laser beam that has been generated in the resonator 24 and propagated in the core 22a and oscillates only in a mode(Y mode) where the phases of the light in the resonators 24 and 25 are synchronized. Then, only this coherently coupled (added) laser beam permeates the reflecting end face 24b and is outputted from port A.

The coherently added laser beam outputted from port A has an output value of 2.57 W, which is almost twice the value obtained when the respective fiber lasers 22 and 23 output independently (port A: 1.36 W, port B: 1.47 W). Furthermore, as shown in FIG. 5, when the respective fiber lasers 22 and 23 output laser beams independently, the output spectra differ from each other according to the wavelength characteristics of the respective resonators 24 and 25, however, in the case of the output obtained by coherent coupling, its output spectrum shows a single peak at approximately 1557.05 nm that is the middle wavelength of the oscillation wavelengths of the fiber lasers 22 and 23. By comparison, when coherently coupling, a laser beam outputted from port B has an output value of 0.17 W, and is an output spectrum showing a single peak at approximately 1557.05 nm that is the middle wavelength similar to the output spectrum from port A. In this case, the addition efficiency of the coherent addition is 91% that is sufficiently practicable. In FIG. 5, the horizontal axis indicates wavelength (nm) and the vertical axis indicates optical output (W/nm), the solid line indicates the output spectrum from port A, the dashed line indicates the output spectrum from port B, the thick line indicates the output spectrum in the case of coherent coupling, and the thin line indicates the output spectrum when the fiber lasers output independently from each other.

Figure 6A:
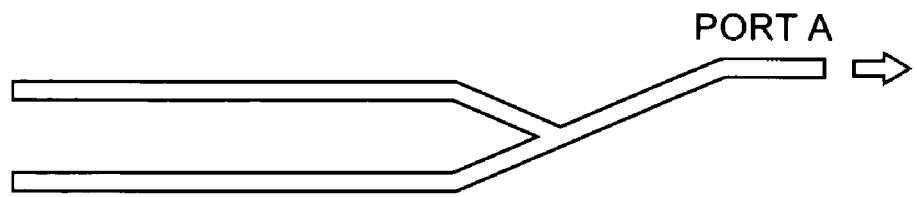
FIG. 6A is a drawing showing an output pattern in a Y mode when outputting from port A.
Figure 6B:
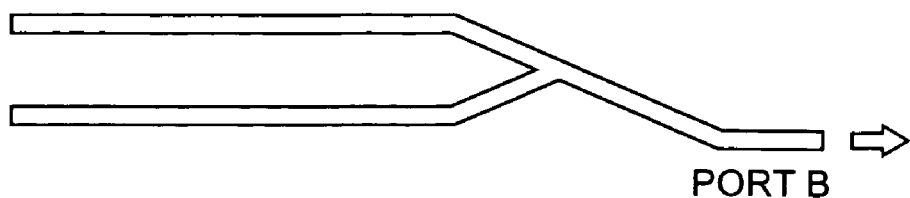
FIG. 6B is a drawing showing an output pattern in a Y mode when outputting from port B.
Figure 7:
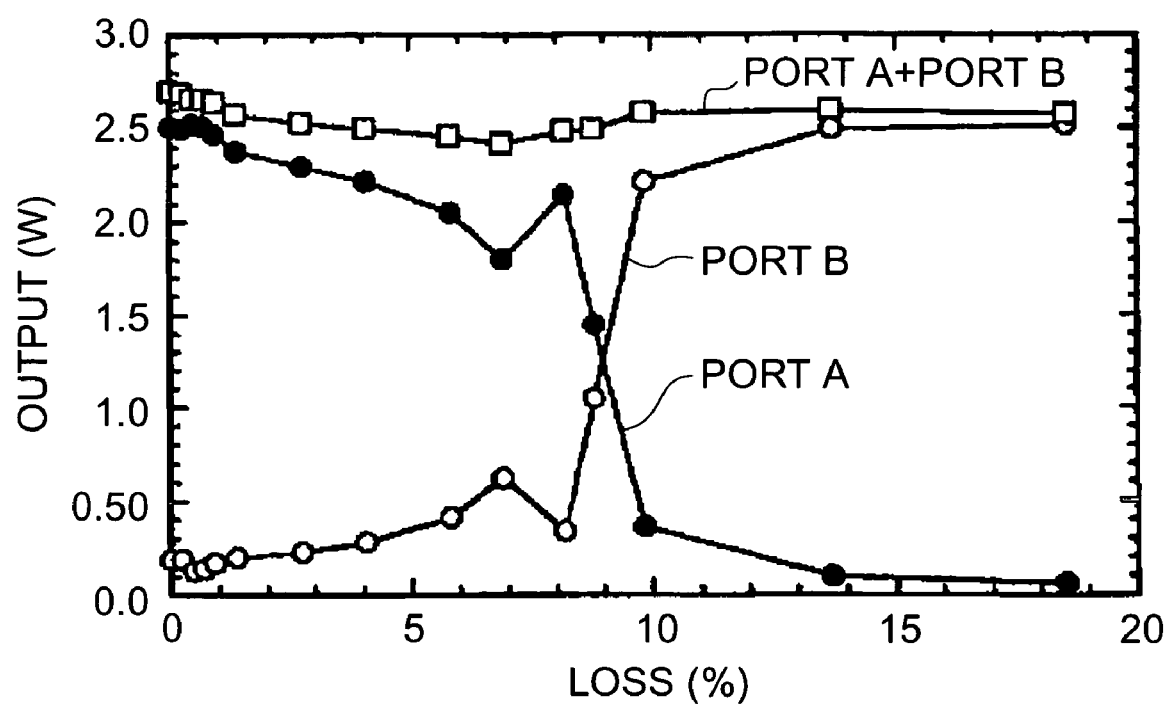
FIG. 7 is a diagram showing changes in output of the port A and the port B when a loss to be applied to the port A is changed in the fiber laser unit of FIG. 3.

The coupling principle and the loss to be applied in the fiber laser unit 21 are described further with reference to FIG. 6A, FIG. 6B, and FIG. 7. FIG. 6A shows an output pattern in a Y mode when it is outputted from port A. FIG. 6B is an output pattern in a Y mode when it is outputted from port B. FIG. 7 shows changes in output at port A and port B when the bend loss to be applied to port A is changed in the fiber laser unit.

In the fiber laser unit 21, when two fiber lasers 22 and 23 are completely balanced in resonator length and fiber propagation constant, according to the super mode theory, diagonalization to two modes where outputs are equivalent and only relative phases are different between port A and port B is obtained. However, in an unbalanced state where the resonator lengths are different from each other, etc., as shown in FIG. 6A and FIG. 6B, in the fiber laser unit 21, due to the composite resonator effect, outputs concentrate on only one port, and two Y modes exist in which outputs are centered on the respective ports. By making the two ports A and B unbalanced in loss or extinguishing the reflection on one of the ports, thresholds of the two Y modes can be made different from each other, and a Y mode centered on a port with a smaller loss is selectively excited.

Therefore, in the fiber laser unit 21, in order to provide a difference between thresholds of the two Y modes and selectively excite either Y mode, the bend loss of one port is forcibly increased. In FIG. 7, the horizontal axis indicates bend loss (%), the vertical axis indicates output from port (W), and outputs of port A and port B when the bend loss of the port A side is changed in the case where the bend loss of the port B side is 9% is shown. When the bend loss to be applied to the port A side is smaller than 9%, a coherently added laser beam is outputted from port A in the fiber laser unit 21. On the other hand, when the bend loss to be applied to the port A side is larger than 9%, in the fiber laser unit 21, a coherently added laser beam is outputted from port B. When the bend loss to be applied to the port A side is approximately 9%, in the fiber laser unit 21, the bend loss becomes almost equal between the port A side and the port B side and laser beams equivalent to each other are outputted from port A and port B. Therefore, in the fiber laser unit 21, switching of the output ports is realized by applying losses to the ports of the optical fibers 22e and 23e.

Furthermore, the reason why high addition efficiency is obtained by coherent addition of the laser beams by using fiber lasers is described a somewhat more. In fiber lasers, since the resonator lengths are as long as approximately 10 m and the vertical mode interval is only approximately 10 MHz, a plurality of inherent modes formed by the composite resonator comprising the two resonators with lengths different from each other, that is, a plurality of Y modes exist in the oscillation band, and stable high addition efficiency is realized without controlling the lengths of the fibers. Furthermore, low Q-value operation due to high gain characteristics of the fibers makes coherent addition of many fiber lasers easy. Furthermore, the controllability of the horizontal mode that is the feature of fiber lasers is also considered as contributing to obtain the nonconventional high addition efficiency.

According to this fiber laser unit 21, coherent addition of laser beams is realized by a simple structure in which the cores 22a and 23a are reduced in diameter and disposed in proximity to each other by the optical fiber coupler 28 and a loss is only applied to the port of one of the optical fibers 22e and 23e, whereby the addition efficiency is very high. In addition, in this fiber laser unit 21, switching of the output ports is realized by applying a loss to the port of one of the optical fibers 22e and 23e. Furthermore, in this fiber laser unit 21, by using a laser beam that has leaked from the core of one fiber, injection synchronization into the resonator of the other fiber is carried out and the addition Y mode is automatically excited and phase-coupled, so that accurate adjustment is not necessary.

Figure 8:
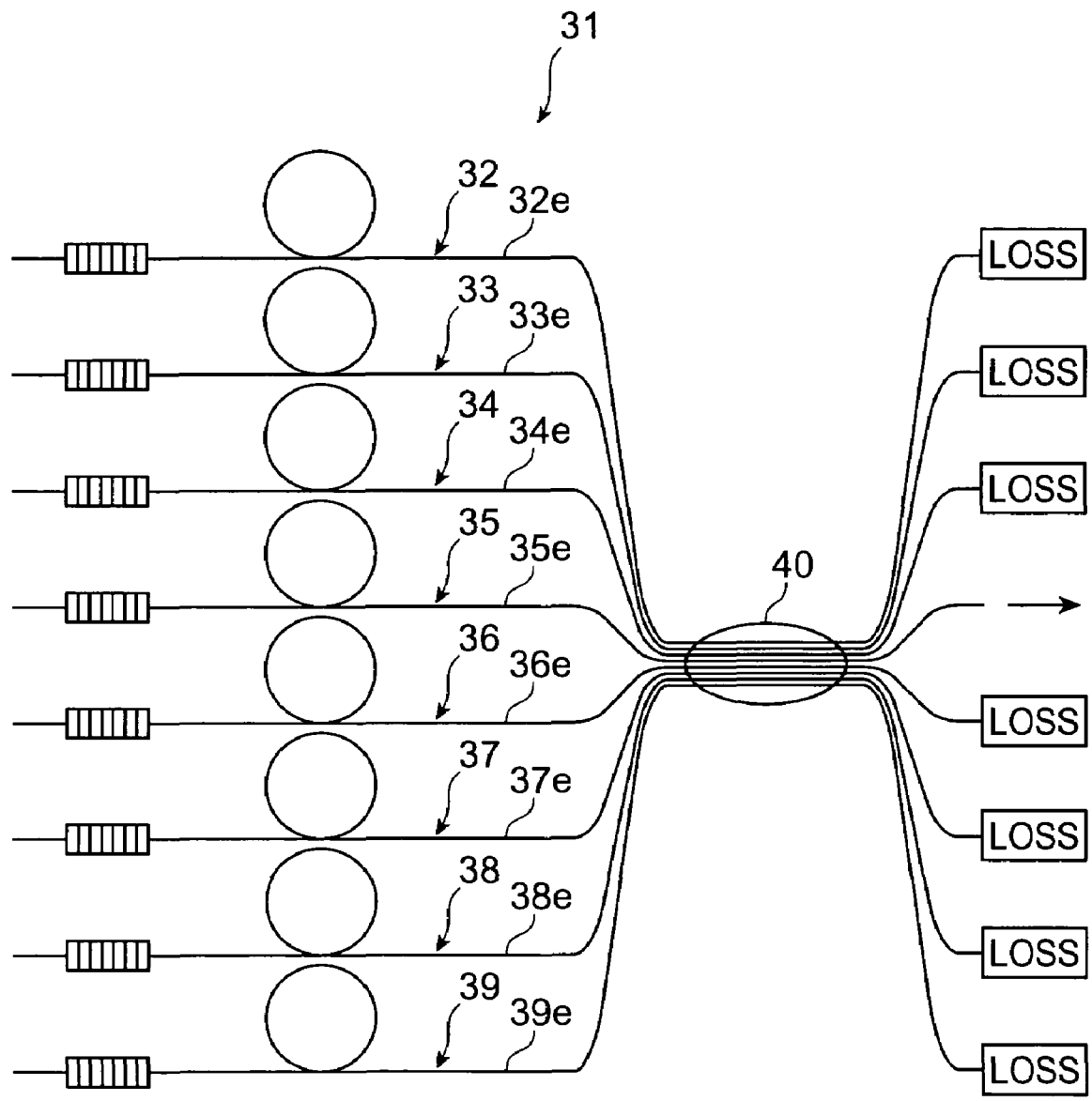
FIG. 8 is a schematic view of a fiber laser unit relating to the present invention in which a portion where the cores are reduced in diameter and made proximal to each other is formed by an integral type fiber coupler.

Fiber laser unit 31 in which the portion where the cores are reduced in diameter and made proximal to each other is formed by an integral type fiber coupler is described with reference to FIG. 8. FIG. 8 is a schematic view in a case where the portion where the cores are reduced in diameter and made proximal to each other is formed by an integral type fiber coupler.

The fiber laser unit 31 has eight fiber lasers 32 through 39, and can output an output obtained by coherent addition of laser beams from the eight fiber lasers 32 through 39 from one fiber laser. Therefore, an optical fiber coupler 40 is provided in the fiber laser unit 31, and laser beams are coherently coupled among the eight fiber lasers 32 through 39 by the optical fiber coupler 40. The eight fiber lasers 32 through 39 have the same structure as that of the fiber lasers 22 and 23 described above. Laser beam oscillation wavelengths of the fiber lasers 32 through 39 may be different from each other, however, oscillation bands of the resonators must overlap each other.

The optical fiber coupler 40 is of 8×8 and has an equally branching ratio, and has a function which leaks laser beams from the cores of the eight optical fibers 32e through 39e and couples the leaked laser beams inside other cores. Therefore, the optical fiber coupler 40 has a melt-drawn portion which is formed by melting and drawing eight optical fibers 32e through 39e and joining clads of the eight optical fibers 32e through 39e to each other. At the melt-drawn portion, the eight optical fibers 32e through 39e (cores) are reduced in diameter and are disposed extremely close to each other.

Furthermore, in order to output a coherently added laser beam from one fiber laser, the fiber laser unit 31 applies a loss to the other seven optical fibers. In the example of FIG. 8, in order to output from the fiber laser 35, the other seven optical fibers 32e through 34e and 36e through 39e are applied with a loss. With this structure, in the fiber laser unit 31, a laser output that is slightly less than 8 times the outputs independently outputted from the respective fiber lasers 32 through 39 is obtained from the fiber laser 35.

According to the fiber laser unit 31, by a simple structure in which the eight fiber lasers 32 through 39 are coupled by the optical fiber coupler 40 of 8×8, a high laser output can be obtained with high addition efficiency. In this example, the structure in which a laser output of slightly less than 8 times is obtained by the optical fiber coupler 40 of 8×8, however, the number to be coupled is not limited to this, and it is possible that a laser output of slightly less than N times is obtained by an optical fiber coupler of N×N.

Figure 9:
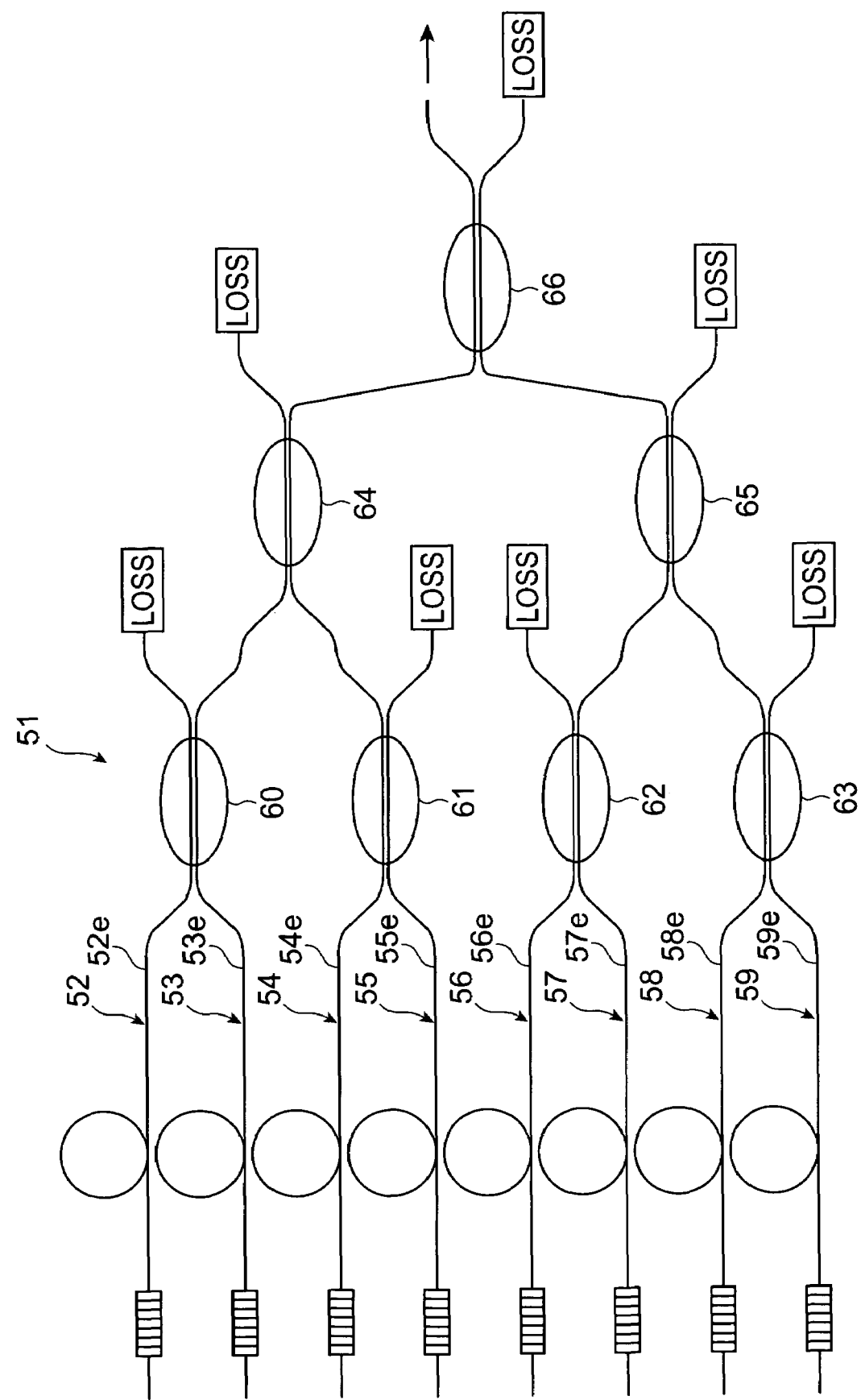
FIG. 9 is a schematic view of a case where the portion where the cores are reduced in diameter and made proximal to each other is formed by cascade connection.

Fiber laser unit 51 in which the portion for reducing the diameters of the cores and making the cores proximal to each other is formed by cascade connection is described with reference to FIG. 9. FIG. 9 is a schematic view of a case where the portion for reducing the diameters of the cores and making the cores proximal to each other is formed by cascade connection.

The fiber laser 51 has eight fiber lasers 52 through 59, and can output an output obtained by coherently adding laser beams of the eight fiber lasers 52 through 59 from one fiber laser. Therefore, in the fiber laser unit 51, as a first stage, fiber lasers 52 through 59 are coupled two each by four optical fiber couplers 60 through 63 of 2×2. Furthermore, in the fiber laser unit 51, as a second stage, four fiber lasers 53, 54, 57, and 58 that output coherently added laser beams are coupled two each by two optical fiber couplers 64 and 65 of 2×2. Furthermore, in the fiber laser unit 51, as a third stage, the two fiber lasers 54 and 57 that output coherent added laser beams are coupled by one optical fiber coupler 66 of 2×2. The eight fiber lasers 52 through 59 have the same structure as that of the fiber lasers 22 and 23 described above. The oscillation wavelengths of the laser beams of the fiber lasers 52 through 59 may be different from each other, however, the oscillation bands of the resonators must overlap each other. The optical fiber couplers 60 through 66 have the same structure as that of the optical fiber coupler 28 described above.

Furthermore, in order to output a coherently added laser beam from one fiber laser, the fiber laser unit 51 applies losses to the other seven optical fibers in a phased manner. In the example of FIG. 9, first, in the first stage, in order to output from the fiber lasers 53, 54, 57, and 58, the other four optical fibers 52e, 55e, 56e, and 59e are applied with a loss, and furthermore, in the second stage, in order to output from the fiber lasers 54 and 57, another two optical fibers 53e and 58e are applied with a loss, and in the third stage, in order to output from the fiber laser 54, the other one optical fiber 57e is applied with a loss. With this structure, in the fiber laser unit 51, a laser output of slightly less than 8 times the outputs outputted independently from the fiber lasers 52 through 59 is obtained from the fiber laser 54.

According to the fiber laser unit 51, by cascade connection by using seven optical fiber couplers 60 through 66 of 2×2, coherent coupling of eight fiber lasers 52 through 59 is realized and a high laser output is obtained with high addition efficiency. In this example, the structure in which eight fiber lasers 52 through 59 are coherently coupled by seven optical fiber couplers 60 through 66 of 2×2 is described, however, the number of fiber lasers are not limited to this, and coherent addition can be realized in a larger number of stages with a simple structure. Furthermore, it is also possible that coherent addition is realized in many stages by means of cascade connection by using optical fiber couplers of 4×4 and 3×3.

An embodiment relating to the invention is described above, however, the present invention is not limited to the embodiment described above and can be carried out in various modes.

For example, in the embodiment, a structure is described in which the fiber laser unit is provided with two fiber lasers, however, the same action and effect is obtained even by a fiber laser unit provided with three or more fiber lasers, and it becomes possible to obtain a laser beam with a higher output by a larger number of fiber lasers.

Furthermore, a bend loss is applied as a loss in the present embodiment, however, a loss may be applied by other means such as immersion with index-matching liquid on the end face.

Furthermore, in the present embodiment, an optical fiber coupler is used for the core diameter reduced portion, an FBG is used as a resonator, and a WDM coupler, etc., is used for introduction of exciting light, however, they are not limited to these, and these parts may be formed by other means. Particularly, for the core diameter reduced portion, an optical fiber coupler is not necessarily used, and any device can be used as long as it serves as a beam splitter.

Furthermore, in the present embodiment, erbium is used as a laser active substance, however, other rare-earth elements, etc., can be used.

In addition, in the present embodiment, the oscillation wavelengths of laser beams of the two fiber lasers are set to different wavelengths (1556.9 nm and 1557.1 nm), however, they may be set to the same wavelength. In the case of the different wavelengths, the oscillation bands of the resonators must overlap each other.

INDUSTRIAL APPLICABILITY

A fiber laser unit relating to the invention can realize coherent addition of lasers with extremely high addition efficiency by a simple structure in which injection synchronization is carried out by laser beams leaked from cores by making the cores proximal to each other. Furthermore, this fiber laser unit does not need accurate adjustment since, by using a laser beam leaked from one core, injection synchronization into the resonator of another fiber laser is carried out and a constructive interference super mode(Y mode) is automatically excited and phase-coupled. Therefore, this fiber laser unit can be widely practicable for industrial use.

Furthermore, the fiber laser unit relating to the present invention forms the portion where the cores are reduced in diameter and made proximal to each other by an optical fiber coupler, whereby the entire unit can be easily structured. In addition, the fiber laser unit relating to the present invention can control the output destination and make switching by applying a loss to the ports of fiber lasers other than a fiber laser that is made to output.

The invention claimed is:

1. Fiber laser unit comprising a plurality of fiber lasers that generate laser beams by exciting a laser active substance inside cores by exciting light, propagate the laser beams inside the cores and output from the ends thereof, wherein
   each of the fiber lasers has a resonator structure that reflects a laser beam on both ends; and
   the cores of the fiber lasers are made proximal to each other at a part, and by using a laser beam outputted from the inside of the core of an arbitrary fiber laser, injection synchronization is carried out inside resonators of other fiber lasers, and among the plurality of fiber lasers, a loss is applied to ports of the fiber lasers except for one fiber laser.

2. The fiber laser unit according to claim 1, wherein each of the fiber lasers has a structure in which a part of the cores is reduced in diameter, and the cores are made proximal to each other at the core diameter reduced portion.

3. The fiber laser unit according to claim 2, wherein the diameter reduced portion and the proximity portion are formed by an optical fiber coupler.

* * * * *